United States Patent [19]

Sourani et al.

[11] Patent Number: 5,142,237
[45] Date of Patent: Aug. 25, 1992

[54] METHOD OF DEMODULATION

[75] Inventors: Sason Sourani, Hod-Hasharon; Shmuel Reich, Rishon Le-Zion; Shlomo Berliner, Petach Tikva, all of Israel

[73] Assignee: Motorola, Inc., Schaumburg, Ill.

[21] Appl. No.: 518,356

[22] Filed: May 3, 1990

[30] Foreign Application Priority Data

May 17, 1989 [GB] United Kingdom ............... 8911329

[51] Int. Cl.⁵ .................... H03D 3/00; H03K 9/06
[52] U.S. Cl. .................... 329/300; 375/88; 375/97
[58] Field of Search ............... 329/300, 302, 303, 336; 375/80, 88, 89, 90, 97, 120

[56] References Cited

U.S. PATENT DOCUMENTS 4,291,269 9/1981 Nossen .................... 375/97

Primary Examiner—David Mis
Attorney, Agent, or Firm—Wayne J. Egan

[57] ABSTRACT

A method of demodulation is provided for demodulating a signal in which different data symbols are represented by different frequencies, such as a modem. A set of undelayed and a set of delayed sample values are provided and a frequency transform calculation is performed on the difference between the first N undelayed values and the last N delayed values. An early/late synchronization decision is taken dependent on the difference value.

27 Claims, 1 Drawing Sheet

METHOD OF DEMODULATION

BACKGROUND OF THE INVENTION

This invention relates to a method of demodulation of a signal in which different data symbols are represented by different frequencies. The method is suitable for fast symbol synchronisation in modems. This method is particularly applicable to U.S. Federal Standard 1045 and Military Standard 188-141A.

SUMMARY OF THE PRIOR ART

One of the most popular methods of symbol synchronisation in modems is the advance/retard algorithm, otherwise referred to as an early-late gate. The algorithm is described in many publications such as the book "Digital Communications" by Proakis, and is summarised here with reference to FIG. 1.

The signal is sampled at a rate of, for example, 64 samples per symbol. The aim of the algorithm is to align the 64 samples accurately on the symbol. The samples in the time domain are transformed by means of fast Fourier transform into the frequency domain, providing frequency components of different magnitudes, as shown in FIG. 2. The symbol represented by the signal is indicated by the strongest frequency component (010 in this example). This frequency domain value is a result of an accumulation of all the components of the transform in the time domain. Referring to the accumulation as being accumulation A, a delay of delta is introduced to the sampling and the operation is repeated for a second set of 64 samples, providing a different result, referred to as accumulation B. The delay delta may be, for example, 1-4 samples. These two very close accumulations in what may be referred to as different matched filters reveal whether the synchronisation is early or late. If the level of the relevant component in the frequency domain in accumulation B is greater than in accumulation A, synchronisation is assumed to be early and an advance command may be given. On the other hand, if the result in B is smaller than in A, synchronisation is assumed to be late and a retard command may be given. An advance or retard command causes sampling to be advanced or retarded by a predetermined amount, e.g. 1-4 samples.

The above basic synchronisation algorithm calls for a very large amount of processing. Fourier transforms should be calculated twice, each transform requiring many multiplication operations. Multiplication operations place a heavy burden on the processing capacity. Such a synchronization algorithm is possible in digital signal processors specially designed for fast multiplications/additions. Digital signal processors are between 5 to 10 times more expensive than general purpose microprocessors. For slow data rates such powerful signal processors may be omitted. It would be desirable to provide a synchronisation algorithm that is more efficient and enables slower processors to be used to achieve the synchronisation.

The invention may also be used in digital signal processors in order to increase efficiency and symbol rate upper limit.

SUMMARY OF THE INVENTION

According to the present invention, there is provided a method of demodulation of a signal in which different data symbols are represented by different frequencies, comprising the steps of:

sampling the signal at a predetermined number of sampling points to provide a set of undelayed values delaying the sampling by N samples to provide a set of delayed values; and deriving a difference value for the frequency content of the delayed and undelayed values, whereby the difference value is indicative of early or late synchronisation, characterised by performing a transform calculation on the difference between the first N undelayed values and the last N delayed values to provide the difference value.

If $N=4$, there are only 4 difference values on which Fourier transforms need to be calculated in order to implement the early-late gate (it is still necessary to convert one set of samples to the frequency domain in order to demodulate the signal and determine the symbol represented).

The method of the invention may be visualised by rotating the last 4 samples of accumulation B to the front of accumulation B and performing a subtraction operation between the accumulations A and B, whereby the remaining 60 samples which are identical in each accumulation cancel each other out. In a preferred embodiment, the actual samples in one of the sets are rotated in order by N positions such that the first N undelayed values and the last N delayed values correspond in position in the sets. This is carried out by suitable manipulation of the memory addresses of the various samples in microprocessor memory.

DETAILED DESCRIPTION OF THE INVENTION

Figure 1:
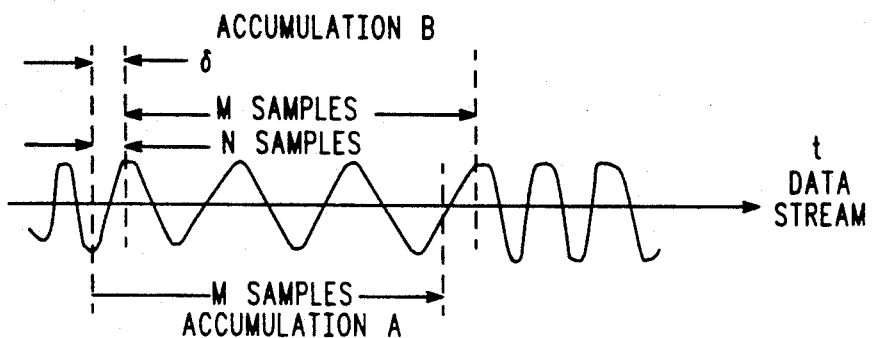
FIG. 1 is a diagram of a typical signal for demodulation in the modem (noise not included for purposes of clarity).
Figure 2:
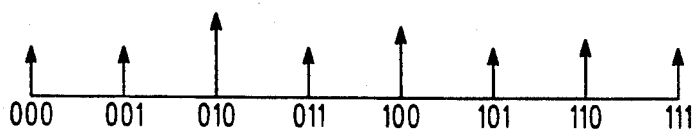
FIG. 2 is a frequency domain representation of the Fourier components of the signal of FIG. 1.

As for the prior art method, one bit length of the signal of FIG. 1 is sampled a predetermined number of times M (e.g. 64 times) and the frequency domain values such as those shown in FIG. 2 are calculated by discrete Fourier transform (DFT) in software, e.g. by fast Fourier transform (FFT). A second set of M samples is also taken in matched filter B, after a delay indicated as delta. The delay is equivalent to a predetermined number of samples N, e.g. 4 samples. There is no need to calculate the equivalent values for matched filter B, since the result can be derived in an easier way as shown by the following explanation.

The sample points of filter B are rearranged from their initial state:

"A" $a_0, a_1, \ldots, a_{N-1}, a_N, \ldots, a_{M-1}$

"B" $a_N, a_{N+1}, \ldots, a_{M+N-1}$ to a different cyclic state:

"A" $a_0, a_1, \ldots, a_{N-1}, a_N, a_{M-1}$

"B" $a_M, a_{M-1}, \ldots, a_{M+N-1}, a_N, \ldots, a_{M-1}$.

This change will alter the phase component of the Fourier transform but not its absolute value.

In the specific case where M=64 and N=4, the result is:

"A" $a_0, a_1, \ldots, a_3, a_4, \ldots, a_{63}$

"B" $a_{64}, a_{65}, \ldots, a_{67}, a_4, \ldots, a_{63}$

The samples of accumulator B are simply subtracted from the samples of corresponding position in accumulator A. As a result, there are only N non-zero difference values. In the specific example, these are:

$a_0 - a_{64}, a_1 - a_{65}, a_2 - a_{66}$ and $a_3 - a_{67}$

Discrete Fourier transforms are calculated for these N difference values. The additional M-N values are zero and may be omitted. The result has real and imaginary parts. Each part should be added to the corresponding part of the non-delayed DFT result to provide a new value (frequency component). If the frequency component for the symbol in question (already determined as having the strongest component from the DFT results for accumulator a alone) is positive, then synchronisation is assumed to be late, whereas if it is negative, synchronisation is assumed to be early.

A general proof of the theory of the invention is as follows. Let it be supposed that the DFT results according to the prior art method are $A_{f1}, \ldots, A_{fk}$ and $B_{f1}, \ldots, B_{fk}$. For synchronization purposes we have to find whether $A_q$ is higher or lower, with respect to $B_q$, where q is the frequency already determined as having the strongest component.

$B_q = DFT_q\{a_N, a_{N-1}, \ldots, a_M, a_{M-1}, \ldots, a_{M-N-1}\}$

Referring only to the absolute value, we can say:

$B_q = DFT_q\{a_M, a_{M-1}, \ldots a_{M-N-1}, a_N, a_{N-1}, \ldots a_{M-1}\}$ $= DFT_q\{a_M, a_{M-1}, \ldots, a_{M-N-1}, a_N, a_{N-1}, \ldots a_{M-1}\}$ $- DFT_q\{a_0, a_1 \ldots a_{M-1}\} - DFT_q\{a_0, a_1 \ldots a_{M-1}\}$ because of linearity we can combine the first two of these terms to write the same expression as:

$= DFT_q\{a_M - a_0, a_{M-1} - a_1, \ldots, a_{M-N-1} - a_{N-1},$
$a_N - a_N, a_{N-1} - a_{N-1}, \ldots, a_{M-1} - a_{M-1}\} +$
$DFT_Q\{a_0, a_1 \ldots a_{M-1}\}$ $= DFT_q\{a_M - a_0, a_{M-1} - a_1, \ldots, a_{M-N-1} - a_{N-1},$
$0, 0, \ldots 0\} +$
$DFT_q\{a_0, a_1 \ldots a_{M-1}\}$ The last part is already known from the first DFT. The first part is mostly zero and can be derived easily in a DFT/FFT algorithm much faster than DFT/FFT with non-zero elements.

For one sample difference, for instance, there is no need to make any multiplications at all, just add $a_N - a_0$ to the real part of the FFT of "A" and recheck absolute values. For N>1 there is a need for a few multiplications.

The result should have better accuracy since mathematical manipulations are done only on the differences.

Figure 3:
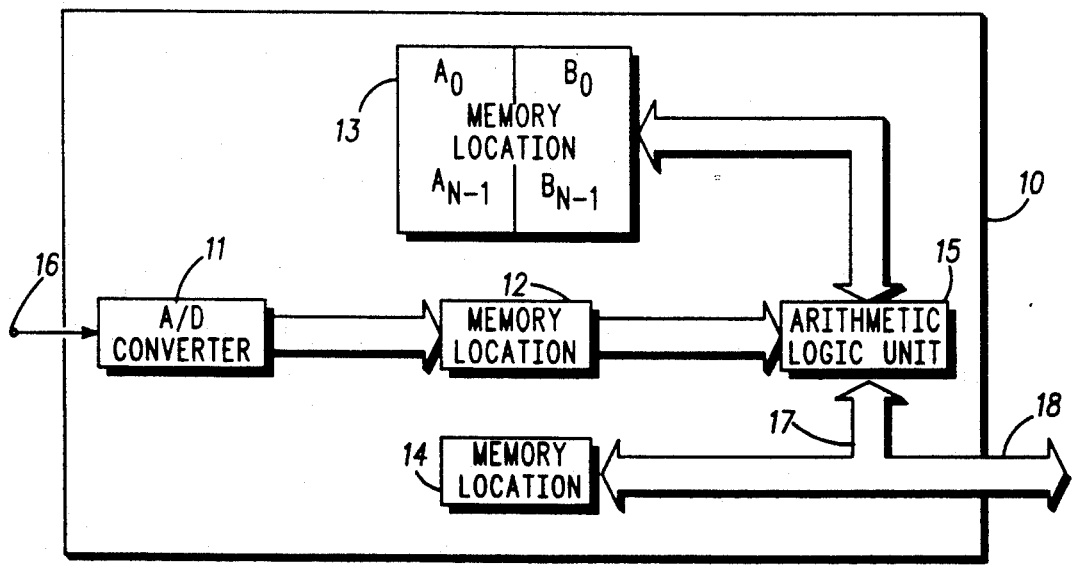
FIG. 3 is a diagram illustrating operation of the invention in a microprocessor.

The implementation of the algorithm in a microprocessor is illustrated in FIG. 3. In this figure there is shown a microprocessor 10, having an A/D converter 11, memory locations 12, 13 and 14 and an arithmetic and logic unit (ALU) 15.

The incoming analog signal is sampled by the A/D converter 11 at a rate of 2400 samples per second. These samples are stored in memory location 12. In memory location 13, the addresses of samples $a_0 \ldots a_{M-1}$ are stored, as are the addresses of samples $b_0 \ldots b_{M-1}$. Arithmetic and logic unit 15 recalls the data from addresses $a_0 \ldots a_{M-1}$ in memory location 12 and performs the DFT calculation to determine the received symbol. This symbol is stored in memory location 14 and is available as an output. ALU 15 then causes the addresses $b_0 \ldots b_{M1}$ to be rotated in memory location 13. The samples identified by the new pairs of addresses A and B are again recalled from memory location 12 and a difference value is calculated in ALU 15. For each pair of samples, this value is temporarily stored in memory location 14. From these stored difference values, a DFT calculation is performed as described above and an early/late decision is carried out by ALU 15. In response to this decision, the addresses $a_0$ etc. of the data from memory location 12 are advanced or retarded for the next symbol.

In an alternative example, the incoming signal comprises symbols of 8 millisec length and is sampled at a rate of 8 kbits/sec.

The number of samples of the delay, N, may be any number from 1 to half of the number of samples in a symbol—i.e. in the above case N may be between 1 and 32. It is preferred that N lies in the range of 1 to 8.

We claim:

1. A method of demodulating a data signal in which different data symbols are represented by different frequencies, the method comprising the steps of:
    (a) receiving and sampling a signal for demodulation;
    (b) selecting a predetermined number of sampling points in accordance with an assumed synchronization between the sampling points and a data symbol to provide a first set of values;
    (c) selecting a set of said predetermined number of sampling points removed by N samples relative to the set of sampling points of the undelayed values to provide a set of delayed values;
    (d) performing a frequency transform calculation on one of the sets of undelayed and delayed values to provide a set of frequency transform values;
    (e) ascertaining the dominant frequency of the signal from the frequency transform values;
    (f) calculating the differences between the first N undelayed values and the last N delayed values to provide a set of difference values;
    (g) performing a frequency transform calculation on the set of difference values;
    (h) ascertaining the sign of the frequency component of the set of difference values corresponding to the dominant frequency component of the signal;
    (i) determining that the assumed synchronization is early when said sign indicates an increase in the dominant frequency component in the set of delayed values and that it is late when said sign indicates a decrease in said component and selecting a new set of said predetermined number of sampling points accordingly; and, (j) demodulating the data symbol from the new set of sampling points.

2. The method of claim 1, wherein the values in one of the sets of delayed and undelayed values are rotated in order by N positions in the set such that the first N undelayed values and the last N delayed values correspond in position in the sets and a subtraction operation is carried out between values of corresponding position in the two sets whereby all values other than the first N undelayed values and the last N delayed values cancel each other.

3. The method of claim 1 or claim 2 wherein N is a number between 1 and half of the predetermined number.

4. The method of claim 1 or claim 2 wherein N is a number between 1 and 8.

5. The method of claim 1 or claim 2, wherein $N = 1$.

6. The method of claim 1 or claim 2, wherein $N = 4$.

7. A demodulator for demodulating a data signal in which different data symbols are represented by different frequencies, comprising:
  means for receiving and sampling;
  first selecting means for selecting a predetermined number of sampling points in accordance with an assumed synchronization between the sampling points and a data symbol to provide a first set of values;
  second selecting means for selecting a set of said predetermined number of sampling points removed by N samples relative to the set of sampling points of the undelayed values to provide a set of delayed values; and
  means for performing a frequency transform calculation on one of the sets of undelayed and delayed values to provide a set of frequency transform values;
  means for ascertaining the dominant frequency of the signal from the frequency transform values;
  means for calculating the differences between the first N undelayed values and the last N delayed values to provide a set of difference values;
  means for performing a frequency transform calculation on the set of difference values;
  means for ascertaining the sign of the frequency component of the set of difference values corresponding to the dominant frequency component of the signal;
  means for determining that the assumed synchronization is early when said sign indicates an increase in the dominant frequency component in the set of delayed values and that it is late when said sign indicates a decrease in said component and selecting a new set of said predetermined number of sampling points accordingly; and,
  means for demodulating the data symbol from the new set of sampling points.

8. A demodulator arranged for demodulating a data signal in which different data symbols are represented by different frequencies in accordance with a predetermined method, the method comprising the steps of:
  (a) receiving and sampling a signal for demodulation;
  (b) selecting a predetermined number of sampling points in accordance with an assumed synchronization between the sampling points and a data symbol to provide a first set of values;
  (c) selecting a set of said predetermined number of sampling points removed by N samples relative to the set of sampling points of the undelayed values to provide a set of delayed values;
  (d) performing a frequency transform calculation on one of the sets of undelayed and delayed values to provide a set of frequency transform values;
  (e) ascertaining the dominant frequency of the signal from the frequency transform values;
  (f) calculating the differences between the first N undelayed values and the last N delayed values to provide a set of difference values;
  (g) performing a frequency transform calculation on the set of difference values;
  (h) ascertaining the sign of the frequency component of the set of difference values corresponding to the dominant frequency component of the signal;
  (i) determining that the assumed synchronization is early when said sign indicates an increase in the dominant frequency component in the set of delayed values and that it is late when said sign indicates a decrease in said component and selecting a new set of said predetermined number of sampling points accordingly; and,
  (j) demodulating the data symbol from the new set of sampling points.

9. The demodulator of claim 8, wherein the values in one of the sets of delayed and undelayed values are rotated in order by N positions in the set such that the first N undelayed values and the last N delayed values correspond in position in the sets and a subtraction operation is carried out between values of corresponding position in the two sets whereby all values other than the first N undelayed values and the last N delayed values cancel each other.

10. The demodulator of claim 9 wherein N is a number between 1 and half of the predetermined number.

11. The demodulator of claim 9 wherein N is a number between 1 and 8.

12. The demodulator of claim 9 wherein $N = 1$.

13. The demodulator of claim 9 wherein $N = 4$.

14. The demodulator of claim 8 wherein N is a number between 1 and half of the predetermined number.

15. The demodulator of claim 8 wherein N is a number between 1 and 8.

16. The demodulator of claim 8 wherein $N = 1$.

17. The demodulator of claim 8 wherein $N = 4$.

18. A microprocessor programmed for demodulating a data signal in which different data symbols are represented by different frequencies in accordance with a predetermined method, the method comprising the steps of:
  (a) receiving and sampling a signal for demodulation;
  (b) selecting a predetermined number of sampling points in accordance with an assumed synchronization between the sampling points and a data symbol to provide a first set of values;
  (c) selecting a set of said predetermined number of sampling points removed by N samples relative to the set of sampling points of the undelayed values to provide a set of dealyed values;
  (d) performing a frequency transform calculation on one of the sets of undelayed and delayed values to provide a set of frequency transform values;
  (e) ascertaining the dominant frequency of the signal from the frequency transform values;
  (f) calculating the differences between the first N undelayed values and the last N delayed values to provide a set of difference values;

(g) performing a frequency transform calculation on the set of difference values;

(h) ascertaining the sign of the frequency component of the set of difference values corresponding to the dominant frequency component of the signal;

(i) determining that the assumed synchronization is early when said sign indicates an increase in the dominant frequency component in the set of delayed values and that it is late when said sign indicates a decrease in said component and selecting a new set of said predetermined number of sampling points accordingly; and, (j) demodulating the data symbol from the new set of sampling points.

19. The microprocessor of claim 18, wherein the values in one of the sets of delayed and undelayed values are rotated in order by N positions in the set such that the first N undelayed values and the last N delayed values correspond in position in the sets and a subtraction operation is carried out between values of corresponding position in the two sets whereby all values other than the first N undelayed values and the last N delayed values cancel each other.

20. The microprocessor of claim 19 wherein N is a number between 1 and half of the predetermined number.

21. The microprocessor of claim 19 wherein N is a number between 1 and 8.

22. The microprocessor of claim 19 wherein N=1.

23. The microprocessor of claim 19 wherein N=4.

24. The microprocessor of claim 18 wherein N is a number between 1 and half of the predetermined number.

25. The microprocesor of claim 18 wherein N is a number between 1 and 8.

26. The microprocessor of claim 18 wherein N=1.

27. The microprocessor of claim 18 wherein N=4.

* * * * *

UNITED STATES PATENT AND TRADEMARK OFFICE
CERTIFICATE OF CORRECTION

PATENT NO. : 5,142,237
DATED : August 25, 1992
INVENTOR(S) : Sason Sourani; Shmuel Reich; Shlomo Berliner It is certified that error appears in the above-identified patent and that said Letters Patent is hereby corrected as shown below:

In the Abstract:

Line 3, "as a modem" should be --as in a modem--.

Signed and Sealed this

Ninth Day of November, 1993

Attest:

BRUCE LEHMAN

Attesting Officer

Commissioner of Patents and Trademarks